United States Patent
Honjyou et al.

(10) Patent No.: US 12,540,437 B2
(45) Date of Patent: Feb. 3, 2026

(54) INORGANIC FIBER SHEET WITH SHOTS DISTRIBUTED ON THE SIDE SURFACE

(71) Applicant: TOMOEGAWA CORPORATION, Tokyo (JP)

(72) Inventors: Takuya Honjyou, Shizuoka (JP); Hirokazu Matsumoto, Shizuoka (JP); Tomoki Furue, Shizuoka (JP)

(73) Assignee: TOMOEGAWA CORPORATION, Tokyo (JP)

( * ) Notice: Subject to any disclaimer, the term of this patent is extended or adjusted under 35 U.S.C. 154(b) by 111 days.

(21) Appl. No.: 18/552,787

(22) PCT Filed: Mar. 18, 2022

(86) PCT No.: PCT/JP2022/012590
§ 371 (c)(1),
(2) Date: Sep. 27, 2023

(87) PCT Pub. No.: WO2022/210020
PCT Pub. Date: Oct. 6, 2022

(65) Prior Publication Data
US 2024/0175210 A1    May 30, 2024

(30) Foreign Application Priority Data
Mar. 29, 2021    (JP) .................................. 2021-056181

(51) Int. Cl.
*D21H 15/02* (2006.01)
*D04H 1/4209* (2012.01)
*D21H 13/38* (2006.01)

(52) U.S. Cl.
CPC ........... *D21H 15/02* (2013.01); *D04H 1/4209* (2013.01); *D21H 13/38* (2013.01); *D10B 2101/02* (2013.01); *D10B 2403/024* (2013.01)

(58) Field of Classification Search
CPC ........ D21H 15/02; D21H 13/38; D21H 27/00; D04H 1/4209; D04H 1/43838;
(Continued)

(56) References Cited

U.S. PATENT DOCUMENTS 3,125,404 A * 3/1964 Crawley .................. D04H 1/43
                                                139/420 R
3,478,137 A    11/1969 Barshefsky et al.
(Continued)

FOREIGN PATENT DOCUMENTS

CN        1788369 A  *  6/2006  .......... H01M 50/489
CN      118742689 A  * 10/2024  ............. D21H 15/02
(Continued)

OTHER PUBLICATIONS

The International Preliminary Report on Patentability of the corresponding WO application No. PCT/JP2022/012590 issued Oct. 3, 2023, which includes an English translation of Written Opinion of the International Searching Authority of the corresponding WO application No. PCT/JP2022/012590 mailed May 24, 2022.

(Continued)

*Primary Examiner* — Jose A Fortuna
(74) *Attorney, Agent, or Firm* — Muncy, Geissler, Olds & Lowe, P.C.

(57) ABSTRACT

An inorganic non-woven fiber sheet has a thickness T of 1 mm or more and contains shots derived from inorganic fibers and having a diameter of 45 μm or more. The shots is distributed as represented by "1−Y/X≤0.11." Wherein X represents "a total weight of the shots in the inorganic fiber sheet per unit area"/"a total weight of the inorganic fiber sheet per unit area", and Y represents "a weight of the shots per unit area included in the inorganic fiber sheet from which a portion having a thickness t and satisfying 0≤t≤s is removed, 0.10 mm≤s≤0.55 mm, with a wire side surface as (Continued)

a reference surface"/"a weight per unit area of the inorganic fiber sheet from which the portion having the thickness t is removed with the wire side surface as the reference surface".

8 Claims, 1 Drawing Sheet

(58) Field of Classification Search
CPC .............. D04H 1/732; D10B 2101/02; D10B 2403/024; F16L 59/04; F16L 59/02
See application file for complete search history.

(56) References Cited

U.S. PATENT DOCUMENTS

| | | | |
|---|---|---|---|
| 4,448,639 A | 5/1984 | Long | |
| 5,989,736 A * | 11/1999 | Lintz | D21H 13/50 428/688 |
| 6,478,829 B1 * | 11/2002 | Zguris | H01M 50/417 28/104 |
| 10,894,737 B2 | 1/2021 | Hankinson et al. | |
| 11,585,084 B2 * | 2/2023 | Imae | D04H 1/558 |
| 11,788,278 B2 * | 10/2023 | Imae | E04B 1/7666 428/74 |
| 2006/0281008 A1 | 12/2006 | Mitani et al. | |
| 2008/0066438 A1 * | 3/2008 | Inagaki | C04B 38/02 55/522 |
| 2015/0052880 A1 * | 2/2015 | Vandervoort | H01B 3/52 252/62 |
| 2023/0107069 A1 * | 4/2023 | Imae | B32B 1/08 428/74 |
| 2023/0275289 A1 * | 8/2023 | Middendorf | H01M 50/204 429/120 |
| 2023/0282905 A1 * | 9/2023 | Wu | H01M 50/204 429/120 |
| 2023/0299403 A1 * | 9/2023 | Shiraku | H01M 50/231 429/175 |
| 2024/0175210 A1 * | 5/2024 | Honjyou | D04H 1/43838 |
| 2024/0328047 A1 * | 10/2024 | Yamazaki | D04H 1/587 |

FOREIGN PATENT DOCUMENTS

| | | | | |
|---|---|---|---|---|
| EP | 4317579 A1 * | 2/2024 | | D04H 1/4209 |
| JP | 10-317298 A | 12/1998 | | |
| JP | 11-323769 A | 11/1999 | | |
| JP | 2002-283486 A | 10/2002 | | |
| JP | 2003-286677 A | 10/2003 | | |
| JP | 2005-265038 A | 9/2005 | | |
| JP | 2018-95976 A | 6/2018 | | |
| JP | 2023164450 A * | 11/2023 | | D04H 1/558 |
| WO | WO-2004088774 A1 * | 10/2004 | | H01M 50/489 |
| WO | WO-2017121770 A1 * | 7/2017 | | C03B 37/055 |
| WO | 2020/202901 A1 | 10/2020 | | |
| WO | WO-2022210020 A1 * | 10/2022 | | D04H 1/4209 |
| WO | WO-2024176984 A1 * | 8/2024 | | D04H 1/58 |
| WO | WO-2025052802 A1 * | 3/2025 | | D21H 13/38 |

OTHER PUBLICATIONS

The extended European search report of the corresponding EP application No. 22780235.2 mailed Feb. 24, 2025.

* cited by examiner

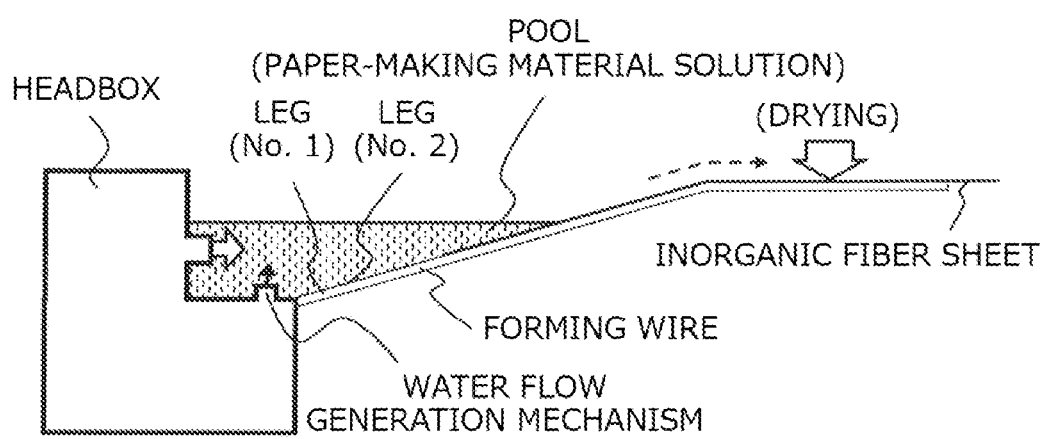

INORGANIC FIBER SHEET WITH SHOTS DISTRIBUTED ON THE SIDE SURFACE

BACKGROUND OF THE INVENTION

The present invention relates to an inorganic fiber sheet.

Today, inorganic fiber sheets such as rock wool paper and alkaline earth silicate (AES) paper are frequently used as heat-retaining materials, heat-insulating materials, and the like.

These inorganic fiber sheets are made of inorganic fibers. In such inorganic fibers, particles called shots are always formed at the ends in the fiber manufacturing process. When the fibers with shots are made into a paper by a conventional method, the shots tend to be localized at or near the surface of the fiber sheet. Localization of shots at or near the surface of the fiber sheet in such a manner has resulted in occurrence of the following problem: when a coating agent such as a pressure-sensitive adhesive or an adhesive is applied to the surface of the fiber sheet, the shots fall off together with the coating agent due to impact or the like, and desirable tackiness or adhesiveness cannot be obtained.

For the problem related to shots in an inorganic fiber sheet as described above, JP 2005-265038 A proposes that shots be separated in a manufacturing process to reduce the concentration of shots themselves in a paper sheet. JP H11-323769 A proposes a method of reducing the concentration of shots by centrifuging a paper material solution in which inorganic fibers are dispersed and causing the paper material solution to pass through a screen filter or the like.

However, as a result of reviewing the inorganic fiber sheets according to JP 2005-265038 A and JP H11-323769 A, it has been found that sufficient workability and the like cannot be obtained in some cases.

In light of the above, an object of the present invention is to provide an inorganic fiber sheet with high workability, which is also excellent in tackiness or adhesiveness when a pressure-sensitive adhesive or an adhesive has been applied thereto.

In addition, both of the inorganic fiber sheets according to Patent Literature 1 and Patent Literature 2 require a step of removing shots from inorganic fibers. Thus, there is such a problem that production efficiency is deteriorated and a yield rate of raw materials is reduced.

In light of the above, a second object of the present invention is to provide an inorganic fiber sheet that can be manufactured without lowering production efficiency and a yield rate of raw materials.

BRIEF SUMMARY OF THE INVENTION

The present inventors have conducted intensive studies on the above problems, and resultantly found that the above problems can be solved by setting the distribution state of shots in an inorganic fiber sheet within a specific range, and have completed the present invention. That is, the present invention is as follows.

The present invention provides an inorganic fiber sheet including a non-woven fabric containing inorganic fibers, wherein the inorganic fiber sheet has a thickness T of 1 mm or more, the inorganic fiber sheet includes shots derived from inorganic fibers and having a diameter of 45 μm or more, and the shots included in the inorganic fiber sheet are distributed in a sheet thickness direction as represented by Expression 1 stated below:

$$1 - Y/X \leq 0.11 \quad \text{(Expression 1)}$$

where X represents "a total weight of the shots in the inorganic fiber sheet per unit area "/" a total weight of the inorganic fiber sheet per unit area", and Y represents "a weight of the shots per unit area included in the inorganic fiber sheet from which a portion having a thickness t and satisfying $0 \leq t \leq s$ is removed, provided, however, that 0.10 mm $\leq s \leq 0.55$ mm, with a wire side surface of the inorganic fiber sheet as a reference surface "/" a weight per unit area of the inorganic fiber sheet from which the portion having the thickness t is removed with the wire side surface of the inorganic fiber sheet as the reference surface".

Preferably, a fiber length of the inorganic fibers is 600 μm or more.

Preferably, a content of an organic component in the inorganic fiber sheet is 5.4 to 10.1 mass % based on a total amount of the inorganic fiber sheet.

According to the present invention, it is possible to provide an inorganic fiber sheet having high workability, which is also excellent in tackiness or adhesiveness when a pressure-sensitive adhesive or an adhesive has been applied thereto. This inorganic fiber sheet can be manufactured without lowering production efficiency and a yield rate of raw materials.

BRIEF DESCRIPTION OF THE SEVERAL VIEWS OF THE DRAWING(S)

FIG. 1 is a conceptual diagram of an apparatus of manufacturing an inorganic fiber sheet.

DETAILED DESCRIPTION OF THE INVENTION

Hereinafter, an inorganic fiber sheet and the method of manufacturing an inorganic fiber sheet will be described in detail, but the present invention is not limited to the following description at all.

In the present invention, the physical properties, evaluation, and the like of the inorganic fiber sheet are measured for a sample after being left to stand for 12 hours in an atmosphere of 23° C./50% RH unless otherwise specified.

<<<<Inorganic Fiber Sheet>>>>

The inorganic fiber sheet includes at least inorganic fibers and shots derived from the inorganic fibers. The inorganic fiber sheet may contain other components. The inorganic fiber sheet may include other layers, and for example, an adhesive layer or a pressure-sensitive adhesive layer may be laminated.

<<<Structure>>>

<<Density>>

The density of the inorganic fiber sheet is preferably 50 to 1000 kg/m³, more preferably 100 to 500 kg/m³, and particularly preferably 150 to 300 kg/m³. The inorganic fiber sheet having a density within the above-described range can prevent shots from falling off and have the improved mechanical strength and heat insulating properties.

<<Thickness>>

A thickness T of the inorganic fiber sheet is preferably 1 mm or more, more preferably 1 to 50 mm, and particularly preferably 2 to 6 mm in order to optimize the distribution state of shots that will be described later and to obtain sufficient heat insulating properties.

<<<Components>>>
<<Inorganic Fiber>>

The material constituting the inorganic fibers is not particularly limited provided that it can be formed into an inorganic fiber sheet. Examples of the material include metal fibers such as stainless steel fibers, nickel fibers, copper fibers, aluminum fibers, silver fibers, gold fibers, and titanium fibers, glass fibers, carbon fibers, silica fibers, rock wool, slag wool, alumina fibers, and ceramic fibers. The inorganic fibers may include only one, or two or more of the above.

<Fiber Length>

The fiber length of the inorganic fibers is preferably 500 μm or more, more preferably 600 μm or more, still more preferably 1000 to 3000 μm, and particularly preferably 1000 to 2000 μm. With the fiber length of the inorganic fibers set within the above-described range, wet strength such as durability against wire release and tear resistance can be secured while preventing deterioration of formation due to entanglement of long fibers.

<Fiber Diameter>

The fiber diameter of the inorganic fibers is preferably 1 to 50 μm, and more preferably 1 to 30 μm. With the fiber diameter of the inorganic fibers set within the above-described range, aggregate effect can be obtained, and the strength attributable to entanglement of fibers can be secured while preventing deterioration of formation.

The fiber length of the inorganic fibers is measured by the following method. First, 0.1 g of a sample or a sample burned at 900° C. in the case where the sample is a sheet is dispersed in 10 g of water, and the dispersion liquid is stirred with a spatula for 1 minute. Next, one drop of the dispersion liquid is dropped on the preparation using a dropper, and the dropped dispersion liquid is covered with a cover film. Thereafter, fibers are observed with a microscope at a magnification of 100 times, 20 fibers are measured in descending order of fiber length, and an average value of the 20 fibers is taken as the fiber length of the sample.

The fiber diameter of the inorganic fibers is measured by the following method. First, 0.1 g of a sample or a sample burned at 900° C. in the case where the sample is a sheet is dispersed in 10 g of water, and the dispersion liquid is stirred with a spatula for 1 minute. Next, one drop of the dispersion liquid is dropped on the preparation using a dropper, and the dropped dispersion liquid is covered with a cover film. Thereafter, fibers are observed with a microscope at a magnification of 500 times, 20 fibers are randomly selected and measured, and an average value of the 20 fibers is taken as the fiber diameter of the sample.

<<Shot>>

The inorganic fiber sheet includes a predetermined amount of shots (shots derived from inorganic fibers) having a diameter of 45 μm or more. The upper limit of the diameter of the shot is not particularly limited because the diameter of the shot depends on the diameter of the inorganic fiber, and is 5000 μm, 1000 μm, 500 μm or the like.

More specifically, shots each having a diameter of 45 μm or more are distributed in the sheet thickness direction in the inorganic fiber sheet as represented by the following Expression 1.

$$1-Y/X \leq 0.11 \quad \text{(Expression 1)}$$

where X represents "a total weight of the shots in the inorganic fiber sheet per unit area "/" a total weight of the inorganic fiber sheet per unit area", and Y represents "a weight of the shots per unit area included in the inorganic fiber sheet from which a portion having a thickness t and satisfying $0 \leq t \leq s$ (provided, however, that $0.10 \text{ mm} \leq s \leq 0.55$ mm) is removed, with a wire side surface of the inorganic fiber sheet as a reference surface "/" a weight per unit area of the inorganic fiber sheet from which the portion having the thickness t is removed with the wire side surface of the inorganic fiber sheet as the reference surface".

When "1−Y/X" is valid to the third decimal place in terms of significant figures, "1−Y/X ≤ 0.11" can be replaced with "1−Y/X<0.115".

In accordance with common knowledge in this technical field, the "wire side surface" of the inorganic fiber sheet refers to a surface on which a wire mark is usually present. The wire mark may be erased after wet-laid process. However, when the wire mark is recognized on one side surface, the side surface is surely defined as the wire side surface. The other side surface is referred as either a "not wire side surface" or a "felt side surface." The other side surface means a surface on which no wire mark is present.

In the context of the manufacturing process of inorganic fibre sheets, the wire side surface of the sheet is the surface that comes into contact with a forming wire of a papermaking device. Accordingly, the dewatering of the papermaking material solution (or wet pulp mat) occurs from the underside, which is held by the forming wire of the drying section. Physical indentations are formed on the surface that correspond to the irregularities of the forming wire. These indentations are known as a "wire mark", and the side on which the wire mark is present is known as a "wire side surface."

In Expression 1, "1−Y/X" is more preferably 0.06 or less.

In Expression 1, the lower limit value of "1−Y/X" is not particularly limited, but is, for example, −0.11, −0.10, −0.5, or 0.00. With "1−Y/X" set within the above-described range, bending elasticity, workability of the felt side surface, and the like can be improved, and prevention of the occurrence of delamination can be facilitated.

Here, the weight of the shot in the inorganic fiber sheet per unit area can be measured in accordance with JIS R 3311-1991.

More specifically, the method of measuring the shot content in the inorganic fiber sheet is as follows.

A sample having a weight of 2 g is burned in an electric furnace at 900° C. for 30 minutes and incinerated.

The weight of the combustion residue and the weight of a stainless steel sieve with a sieve opening size of 45 μm (JIS Z-8801) are measured.

The combustion residue is transferred to the sieve, and the fibers are dropped while being pressurized and pulverized.

The shot content is calculated from the shot weight remaining on the sieve and the combustion residue weight.

"The inorganic fiber sheet from which a portion having a thickness t and satisfying $0 \leq t \leq s$ (provided, however, that $0.10 \text{ mm} \leq s \leq 0.55$ mm) is removed, with a wire side surface of the inorganic fiber sheet as a reference surface" is prepared as follows.

No. 5000NS (tape manufactured by Nitto Denko Corporation) is attached to a 5 cm-square sample, and the sample and the tape are laminated at a roll temperature of 80° C., a pressure of 0.05 MPa, and a speed of 0.4 m/min.

Thereafter, the sample is left to stand in a room temperature environment for 10 minutes, and the tape is peeled off over 5 seconds to remove a part in the thickness direction.

In this inorganic fiber sheet, the distribution of shots is different between the surface or the vicinity thereof and the center of thickness or the vicinity thereof in a single layer. That is, in the inorganic fiber sheet, a high density region having a high shot content is formed at or near the center of thickness, whereas a low density region having a low shot content is formed at or near the surface. In a single layer of the inorganic fiber sheet, properties at or near the center of thickness and properties at or near the surface are optimally different. As a result, the workability and the like can be improved while excellent heat insulating properties and mechanical properties are exhibited. Furthermore, contamination and the like at the production site due to dropping off of shots can be prevented, and the working environment and workability can be improved.

<<Other Components>>

Examples of other components include organic components such as a binder, a paper strength enhancer and an organic fiber, and other known components.

The content of the organic component in the inorganic fiber sheet is preferably 1.0 to 15.0 mass %, more preferably 2.0 to 12.5 mass %, and particularly preferably 5.4 to 10.1 mass %, based on the total amount of the inorganic fiber sheet. With the content of the organic component set within the above-described range, the occurrence of cracking of the inorganic fiber sheet can be prevent, and the flame retardancy can be enhanced.

The content of the organic component in the inorganic fiber sheet is measured by the method in accordance with JIS-P 8252. More specific description will now be given.

A sample having a weight of 2 g is placed in a crucible and dried at 120° ° C. for 10 minutes, and then the weight of the sample is measured.

Thereafter, the sample is burned in an electric furnace at 900° ° C. for 30 minutes and incinerated.

The weight reduction rate is calculated from the weight of the combustion residue and the weight after drying.

<<<<Method of Manufacturing Inorganic Fiber Sheet>>>>

Hereinafter, preferred examples of the method of manufacturing an inorganic fiber sheet will be described, but the method of manufacturing an inorganic fiber sheet is not limited thereto at all.

The inorganic fiber sheet can be manufactured by wet papermaking, and preferably can be manufactured using an inclined paper-making machine.

As an example, a specific method of manufacturing an inorganic fiber sheet using the inclined paper-making machine illustrated in FIG. 1 will be described.

First, a paper-making material solution containing a dispersion medium and inorganic fibers is guided into a headbox.

Next, the paper-making material solution is supplied to the headbox while controlling the supply amount of the paper-making material solution with a pump (not illustrated) to form a pool of the paper-making material solution.

Next, the paper-making material solution is convected by a water flow generator provided in a pool of the paper-making material solution.

The paper-making material solution in the pool comes into contact with a forming wire traveling obliquely upward, and is dewatered (dispersion medium is sucked) from below the forming wire, whereby a solid content (inorganic fiber) is deposited on the paper-making material solution, and an inorganic fiber sheet in a wet paper state is formed. As illustrated in FIG. 1, the dewatering start position can be controlled by providing a plurality of legs (No. 1 leg, No. 2 leg, and the like) in dewatering.

Finally, the inorganic fiber sheet in a wet paper state is passed through a drying device (dryer or the like) to obtain base paper of the inorganic fiber sheet.

The base paper of the inorganic fiber sheet may be wound into a roll shape, as necessary.

The inorganic fiber sheet may be appropriately cut into a desired size.

In order to set the shot distribution (1−Y/X) in the inorganic fiber sheet to a predetermined range, it is sufficient that the following operation be performed:

(1) Bring the dewatering start position close to the raw material charging opening, whereby "1−Y/X" can be reduced; and (2) Increase the blowing pressure of the water flow generation mechanism (increase the flow velocity of the water flow), whereby "1−Y/X" can be reduced.

EXAMPLES

Next, the inorganic fiber sheet according to the present invention will be described in more detail with reference to examples and comparative examples, but the present invention is not limited thereto.

<<Raw Materials>>

<Inorganic Fiber>

(Inorganic Fiber A)

Superwool Plus manufactured by Shin-Nippon Thermal Ceramics Corporation, Material: alkaline earth silicate (AES)

Fiber diameter: 2.0 to 14.8 μm

Fiber length: 530 to 3000 μm (Inorganic Fiber B)

ISOWOOL BSSR 1300 manufactured by Isolite Insulating Products Co., Ltd.

Material: alkaline earth silicate (AES)

Fiber diameter: 2.7 to 13 μm

Fiber length: 450 to 3000 μm (Inorganic Fiber C)

ISOFRAX BULK S17 manufactured by Isolite Insulating Products Co., Ltd.

Material: alkaline earth silicate (AES)

Fiber diameter: 1.5 to 11 μm

Fiber length: 850 to 3200 μm

<Other Component>

Acrylate latex (binder)

<<Manufacturing Method>>

Inorganic fiber sheets according to examples and comparative examples were manufactured by using the apparatus illustrated in FIG. 1. The inorganic fibers to be used, the paper-making material solution in the headbox (concentration of the aqueous dispersion of the above-described components), the blowing pressure of the water flow generator ("Left side": back side of the page of FIG. 1, "Right side": front side of the page of FIG. 1), the valve opening degree (adjustment of the supply rate of the paper-making material solution), and the dewatering start position were set as listed in Table 1.

<<<Evaluation>>>

Measurement of the shot content, calculation of "1−Y/X", and measurement of the organic content (ig. loss A (%)) for the inorganic fiber sheet were performed in accordance with the above-described method.

Furthermore, the workability, flame retardancy, bending suitability, and wet strength (durability against wire release) of the inorganic fiber sheet were measured in accordance with the following methods.

The results are listed in Table 2.

<<Workability>>

No. 5000NS (tape manufactured by Nitto Denko Corporation) is attached to a 5 cm-square sample, and the sample and the tape are laminated at a roll temperature of 80° C., a pressure of 0.05 MPa, and a speed of 0.4 m/min.

Thereafter, the sample is left to stand in a room temperature environment for 10 minutes, and the tape is peeled off over 5 seconds to remove a part in the thickness direction.

The initial sample thickness is assumed to be A (mm), and the thickness transferred to No. 5000NS is assumed to be B (mm).

When the transfer rate is defined as C (%)=B/A*100, workability is determined for the value of C on the basis of the following numerical criteria.

⊚: C is 16 or more
○: C is 9.0 or more and less than 16
x: C is less than 9.0

<<Flame Retardancy>>

A sample having a weight of 2 g is placed in an electric furnace at each specified temperature and burned for 5 minutes to be incinerated.

The temperature zone in which the sample is ignited until the sample is incinerated after being put into the electric furnace is recorded.

○: Not ignited before reaching 900° C., or not ignited
Δ: Ignited at 700° C.
x: Ignited at 500° C.

<<Bending Suitability>>

A sample having a size of 25 mm×250 mm is prepared, and a surface thereof on the wire side at the time of papermaking is wound around a cylindrical object having a specified diameter for 1 minute.

At that time, the diameter of the cylindrical object when the sample is cracked is recorded.

○: No crack is generated at ⌀ 60 (mm)
Δ: No crack is generated at ⌀ 100 (mm)
x: Crack is generated at @ 100 (mm)

<<Wet Strength (Wire Releasability)>>

At the time of papermaking, moisture was removed by a dewatering suction, the sample was then released from the wire, and thereafter the end was gripped at two points and the state when the sample was lifted was checked (sample size: 25 cm square).

○: There is no remaining portion of the sheet obtained by papermaking on the wire, and breaking of paper does not occur at the time of lifting.
Δ: There is no remaining portion of the sheet obtained by papermaking on the wire, or breaking of paper does not occur at the time of lifting.
x: There is a remaining portion of the sheet obtained by papermaking on the wire, and breaking of paper occurs at the time of lifting.

TABLE 1

| Classification | Inorganic Fiber | Density (kg/m$^3$) | Fiber Length (μm) | Concentration in Headbox (mass %) | Blowing Pressure (MPa) Left Side/Right Side | Dewatering Start Position | Leg Valve Opening Degree | Sheet Thickness on Adhesive Side (μm) | X | Y | 1 − Y/X |
|---|---|---|---|---|---|---|---|---|---|---|---|
| Example 1 | A | 202 | 1151 | 0.339 | 0.10/0.10 | No. 1 Leg | 1/6 Opening Degree | 357 | 0.326 | 0.312 | 0.043 |
| Example 2 | A | 196 | 1053 | 0.191 | 0.08/0.09 | No. 1 Leg | 2/6 Opening Degree | 307 | 0.424 | 0.377 | 0.111 |
| Example 3 | B | 221 | 1029 | 0.231 | 0.07/0.07 | No. 1 Leg | 1/6 Opening Degree | 456 | 0.279 | 0.301 | −0.079 |
| Example 4 | C | 206 | 1242 | 0.199 | 0.13/0.13 | No. 1 Leg | 1/6 Opening Degree | 440 | 0.444 | 0.438 | 0.014 |
| Example 5 | C | 201 | 1289 | 0.208 | 0.07/0.07 | No. 1 Leg | 1/6 Opening Degree | 283 | 0.486 | 0.457 | 0.060 |
| Example 6 | B | 230 | 1054 | 0.231 | 0.07/0.07 | No. 1 Leg | 1/6 Opening Degree | 371 | 0.321 | 0.311 | 0.031 |
| Example 7 | B | 238 | 1033 | 0.231 | 0.07/0.07 | No. 1 Leg | 1/6 Opening Degree | 295 | 0.283 | 0.277 | 0.042 |
| Example 8 | B | 227 | 1001 | 0.230 | 0.07/0.07 | No. 1 Leg | 1/6 Opening Degree | 518 | 0.298 | 0.294 | 0.013 |
| Example 9 | B | 244 | 1167 | 0.230 | 0.07/0.07 | No. 1 Leg | 1/6 Opening Degree | 462 | 0.351 | 0.337 | 0.040 |
| Example 10 | B | 216 | 625 | 0.230 | 0.07/0.07 | No. 1 Leg | 1/6 Opening Degree | 491 | 0.381 | 0.36 | 0.055 |
| Example 11 | B | 245 | 515 | 0.230 | 0.07/0.07 | No. 1 Leg | 1/6 Opening Degree | 451 | 0.384 | 0.365 | 0.049 |
| Example 12 | B | 239 | 559 | 0.231 | 0.07/0.07 | No. 1 Leg | 1/6 Opening Degree | 531 | 0.288 | 0.277 | 0.039 |
| Comparative Example 1 | B | 218 | 1075 | 0.231 | 0.00/0.00 | No. 2 Leg | 1/6 Opening Degree | 135 | 0.351 | 0.299 | 0.149 |
| Comparative Example 2 | B | 229 | 1112 | 0.230 | 0.00/0.00 | No. 2 Leg | 1/6 Opening Degree | 179 | 0.331 | 0.271 | 0.181 |
| Comparative Example 3 | C | 209 | 1192 | 0.198 | 0.00/0.00 | No. 2 Leg | 1/6 Opening Degree | 219 | 0.371 | 0.321 | 0.135 |
| Comparative Example 4 | B | 233 | 1015 | 0.231 | 0.00/0.00 | No. 2 Leg | 1/6 Opening Degree | 168 | 0.411 | 0.346 | 0.158 |
| Comparative Example 5 | B | 251 | 533 | 0.231 | 0.00/0.00 | No. 2 Leg | 1/6 Opening Degree | 231 | 0.365 | 0.323 | 0.116 |
| Comparative Example 6 | B | 245 | 965 | 0.165 | 0.10/0.10 | No. 2 Leg | 1/6 Opening Degree | 230 | 0.433 | 0.378 | 0.127 |
| Comparative Example 7 | B | 243 | 589 | 0.231 | 0.00/0.00 | No. 2 Leg | 1/6 Opening Degree | 256 | 0.388 | 0.341 | 0.121 |

TABLE 2

| Classification | Workability Evaluation | Igloss A (%) | Flame Retardancy (Ignitability) | Bending Suitability | Wet Strength |
|---|---|---|---|---|---|
| Example 1 | ◎ | 6.9 | ○ | ○ | ○ |
| Example 2 | ○ | 6.1 | ○ | ○ | ○ |
| Example 3 | ◎ | 6.4 | ○ | ○ | ○ |
| Example 4 | ◎ | 7.3 | ○ | ○ | ○ |
| Example 5 | ○ | 7.9 | ○ | ○ | ○ |
| Example 6 | ◎ | 10.1 | ○ | ○ | ○ |
| Example 7 | ◎ | 5.4 | ○ | ○ | ○ |
| Example 8 | ◎ | 2.1 | ○ | X | ○ |
| Example 9 | ◎ | 11 | Δ | Δ | ○ |
| Example 10 | ◎ | 7.2 | ○ | ○ | Δ |
| Example 11 | ◎ | 3.5 | ○ | X | X |
| Example 12 | ◎ | 15 | X | X | X |
| Comparative Example 1 | X | 4.5 | ○ | X | ○ |
| Comparative Example 2 | X | 7.6 | ○ | ○ | ○ |
| Comparative Example 3 | X | 7.2 | ○ | ○ | ○ |
| Comparative Example 4 | X | 11.4 | Δ | Δ | ○ |
| Comparative Example 5 | X | 3.6 | ○ | X | X |
| Comparative Example 6 | X | 5.8 | ○ | Δ | Δ |
| Comparative Example 7 | X | 13.1 | Δ | Δ | X |

The invention claimed is:

1. An inorganic fiber sheet made by wet papermaking using an inclined paper-making machine, comprising a non-woven fabric containing inorganic fibers, wherein
the inorganic fiber sheet has two side surfaces that are opposed in parallel facing in a thickness direction, wherein only one of the two side surfaces is a wire side surface,
the inorganic fiber sheet has a thickness T of 1 mm or more,
the inorganic fiber sheet includes shots derived from inorganic fibers and having a diameter of 45 μm or more, and
the shots included in the inorganic fiber sheet are distributed in a sheet thickness direction as represented by Expression 1 stated below:

$$1 - Y/X \leq 0.11 \quad \text{(Expression 1)}$$

where X represents "a total weight of the shots in the inorganic fiber sheet per unit area"/"a total weight of the inorganic fiber sheet per unit area", and Y represents "a weight of the shots per unit area included in the inorganic fiber sheet from which a portion having a thickness t and satisfying $0 \leq t \leq s$ is removed, provided, however, that 0.10 mm ≤ s ≤ 0.55 mm, with the wire side surface of the inorganic fiber sheet as a reference surface"/"a weight per unit area of the inorganic fiber sheet from which the portion having the thickness t is removed with the wire side surface of the inorganic fiber sheet as the reference surface.

2. The inorganic fiber sheet according to claim 1, wherein a fiber length of the inorganic fibers is 600 μm or more.

3. The inorganic fiber sheet according to claim 2, wherein a content of an organic component in the inorganic fiber sheet is 5.4 to 10.1 mass % based on a total amount of the inorganic fiber sheet.

4. The inorganic fiber sheet according to claim 1, wherein a content of an organic component in the inorganic fiber sheet is 5.4 to 10.1 mass % based on a total amount of the inorganic fiber sheet.

5. The inorganic fiber sheet according to claim 1, wherein the wire side surface is a surface on which a wire mark is present.

6. The inorganic fiber sheet according to claim 5, wherein the other of the two side surfaces of the inorganic fiber sheet is not the wire side surface such that no wire mark is present thereon.

7. The inorganic fiber sheet according to claim 6, wherein the other of the two side surfaces of the inorganic fiber sheet is a felt side surface.

8. The inorganic fiber sheet according to claim 1, wherein the other of the two side surfaces of the inorganic fiber sheet is a felt side surface.

* * * * *